United States Patent [19]

Nugent, Jr. et al.

[11] Patent Number: 5,006,381

[45] Date of Patent: Apr. 9, 1991

[54] UNGELLED POLYAMINE-POLYEPOXIDE RESINS

[75] Inventors: Richard M. Nugent, Jr.; Ken W. Niederst, both of Allison Park; Jerome A. Seiner, Pittsburgh, all of Pa.

[73] Assignee: PPG Industries, Inc., Pittsburgh, Pa.

[21] Appl. No.: 375,659

[22] Filed: Jun. 30, 1989

Related U.S. Application Data

[63] Continuation of Ser. No. 152,177, Feb. 4, 1988, abandoned.

[51] Int. Cl.$^5$ .................. B65D 25/00; B32B 27/08
[52] U.S. Cl. ................... 428/35.4; 428/36.6; 428/36.7; 428/412; 428/413; 428/480; 428/516; 428/523; 525/523

[58] Field of Search ............ 428/36.6, 36.7, 357, 428/35.4, 412, 413, 480, 523, 516; 215/1 C; 525/523

[56] References Cited

U.S. PATENT DOCUMENTS

| | | | |
|---|---|---|---|
| 2,830,721 | 3/1956 | Pinsky et al. | 215/1 C |
| 4,093,594 | 6/1978 | Anderson | 525/523 |
| 4,423,166 | 12/1983 | Moriarity et al. | 523/414 |
| 4,741,936 | 5/1988 | Nohara et al. | 428/483 |

*Primary Examiner*—James Seidleck
*Attorney, Agent, or Firm*—Godfried R. Akorli

[57] ABSTRACT

Ungelled thermoplastic resins, coating compositions of such resins and multilayer containers and packaging films including a layer of an ungelled thermoplastic resin are disclosed. The ungelled thermoplastic resins are reaction products of polyepoxides with polyamines.

14 Claims, No Drawings

UNGELLED POLYAMINE-POLYEPOXIDE RESINS

This is a continuation of application Ser. No. 07/152/177, filed Feb. 4, 1988 now abandoned.

The present invention relates to novel thermoplastic resins which are ungelled reaction products of a polyamine and a polyepoxide and to containers and packaging materials which include a layer of an ungelled thermoplastic polyamine-polyepoxide resin.

BACKGROUND OF THE INVENTION

A variety of ungelled epoxy-amine reaction products are known. For example, U.S. Pat. No. 2,651,589 describes preformed reaction products between a glycidyl ether having a 1,2-epoxy equivalency of greater than one and a hardening agent, e.g., polyamines such as ethylenediamine or diethylenetriamine. However, Example 6 of this patent, illustrates the gelation difficulties well recognized in the art when the reaction involves only one-half mole of a polyamine hardening agent present for each epoxy equivalent. To avoid gelation, such preformed reaction products preferably include one mole of hardening agent, e.g., polyamine, per epoxy equivalent, optionally, as little as 0.9 mole of hardening agent per epoxy equivalent. In a similar fashion, a standard procedure throughout the art in the formation of ungelled polyamine-polyepoxide reaction products is to utilize excess polyamine, i.e., at least two moles of polyamine per epoxide equivalent, followed by stripping off excess amine after completion of the reaction (see, e.g., U.S. Pat. Nos. 2,909,448; 3,129,133; and 4,116,900).

Some ungelled polyamine-polyepoxide reaction products have been utilized in the area of cationic electrodeposition. Such products have included ungelled polyamine-polyepoxide reaction products as described above, further reacted with a monoepoxide or a monocarboxylic acid and with all or part of the amine groups neutralized with a water-soluble acid (see, e.g., U.S. Pat. No. 4,116,900). Other ungelled polyamine-polyepoxide reaction products utilize polyoxyalkylenepolyamines as the polyamine (see, e.g., U.S. Pat. Nos. 3,963,663 and 4,423,166).

In contrast to the prior art, the ungelled thermoplastic resins of the present invention are essentially devoid of oxyalkylene moieties and are formed from admixtures having equivalent ratios of polyamine to polyepoxide which would previously have been considered to yield a gelled product.

SUMMARY OF THE INVENTION

In accordance with the present invention, ungelled thermoplastic resins are provided which are reaction products of: (i) a polyamine essentially devoid of oxyalkylene moieties and containing up to about two primary amino nitrogen groups per molecule and (ii) a polyepoxide, the polyamine and polyepoxide present in the reaction mixture at a molar ratio of from about 1.4:1 to about 0.83:1 based upon moles of polyamine to moles of polyepoxide. The ungelled thermoplastic resins of this invention are further characterized as containing at least about five percent by weight amine nitrogen, preferably at least about seven percent by weight amine nitrogen, more preferably at least about nine percent by weight amine nitrogen. Such resins can be used, e.g., in solution coating compositions for the formation of thermoplastic films with high-barrier, e.g., gas-barrier, properties.

This invention further provides a process of preparing an ungelled thermoplastic resin from a reaction mixture including a polyamine and a polyepoxide at a ratio of from about 1.4:1 to about 0.83:1 based upon moles of polyamine to moles of polyepoxide by steps comprising forming an admixture by slowly adding a polyepoxide to a dilute solution of a polyamine essentially devoid of oxyalkylene moieties and containing up to about two primary amino nitrogen groups per molecule at an addition rate sufficient to avoid gelation and at temperatures sufficient to promote reaction between the polyepoxide and the polyamine, and maintaining the admixture at temperatures and for time sufficient to form the ungelled resin.

In further accordance with this invention, packaging materials and containers comprising at least one layer of a gas-permeable polymer and at least one layer of an ungelled thermoplastic resin are disclosed, such an ungelled thermoplastic resin having a lower gas permeability than the gas-permeable polymer. The layer of an ungelled thermoplastic resin is a reaction product of: (i) a polyamine containing up to about two primary amino nitrogen groups per molecule and (ii) a polyepoxide, the polyamine and polyepoxide present in the reaction mixture at a ratio of from about 2:1 to about 0.83:1 based upon moles of polyamine to moles of polyepoxide. In a preferred embodiment, the ungelled thermoplastic resin is a reaction product of: (i) a polyamine essentially devoid of oxyalkylene moieties and containing up to about two primary amino nitrogen groups per molecule and (ii) a polyepoxide, the polyamine and polyepoxide present in the reaction mixture at a ratio of from about 1.4:1 to about 0.83:1 based upon moles of polyamine to moles of polyepoxide.

DETAILED DESCRIPTION OF THE INVENTION

The novel compositions of matter in this invention are prepared by reacting a polyamine with a polyepoxide to yield ungelled resins. By "ungelled", it is meant that the reaction products of the polyamine and polyepoxide are soluble or dispersible reaction products. Such soluble or dispersible reaction products are fluid under processing conditions of this invention. Generally, the reaction products have relatively low molecular weights in contrast to gelled reaction products having essentially infinitely high molecular weights.

The polyepoxides useful in the preparation of the ungelled resins of the present invention have an average 1,2-epoxy functionality greater than one, preferably at least about 1.4 and most preferably about 2.0. The polyepoxides may be saturated or unsaturated, aliphatic, cycloaliphatic, aromatic, or heterocyclic and may be substituted, if desired, with noninterferring substituents such as hydroxyl groups or the like. Polyepoxides having an average epoxy functionality greater than two may be used but epoxy functionalities much above 2.0 are not preferred because of problems with gelation upon reaction with the polyamines.

Among particular polyepoxides which can be used are polyglycidyl ethers of aromatic polyols, e.g., polyphenols. Such polyepoxides can be produced, for example, by etherification of the aromatic polyol with epichlorohydrin or dichlorohydrin in the presence of an alkali. The aromatic polyol may be, e.g., bis(4-hydroxyphenyl)-2,2-propane (generally known as bisphenol A), bis(4-hydroxyphenyl)-1,1-ethane, bis(4-hydroxyphenyl)-1,1-isobutane, bis(4-hydroxytertiarybutylphenyl)-2,2-propane, bis(2-hydroxynaphthyl)methane, 4,4'-dihydroxybenzo-phenone, 1,5-dihydroxynaphthalene and the like. Bisphenol A is the preferred aromatic polyol in preparation of the polyepoxide.

Other useful polyepoxides may include polyglycidyl ethers of polyhydric aliphatic alcohols such as 1,2-ethanediol, 1,2-propanediol, 1,3-propanediol, 1,4-butanediol, 1,5-pentanediol, diethylene glycol, triethylene glycol, polyethylene glycol, polypropylene glycol and the like. Similarly, the polyhydric aliphatic alcohol may be a hydrogenated polyphenol such as 2,2-bis(4-hydroxycyclohexyl)propane and the like. The polyglycidyl ether of 1,4-butanediol is preferred from among those of polyhydric alcohols. Blends of various polyepoxides, e.g., blends of polyepoxides of aromatic polyols and aliphatic polyols, may also be used.

The polyepoxides usually have molecular weights above about 86, preferably from about 200 to about 700, and more preferably from about 200 to about 400, and have epoxy equivalent weights of above about 43, preferably from about 100 to about 350, and more preferably from about 100 to about 200. Polyepoxides in the lower molecular weight range are preferred as although the desired reaction products of polyamine and polyepoxide are characterized as containing at least about five percent by weight amine nitrogen, they preferably contain at least about seven percent by weight amine nitrogen and more preferably contain at least about nine percent by weight amine nitrogen.

Polyamines used in the preparation of the ungelled resins include up to about two primary amino nitrogen groups per molecule. Such polyamines can further include secondary amino nitrogen groups or tertiary amino nitrogen groups, usually secondary amino nitrogen groups. The polyamines are further characterized as essentially devoid of any oxyalkylene moieties within the molecule. Among the suitable polyamines are aliphatic polyamines, e.g., polyalkylene-polyamines of the formula $R'_2N-R(NH-R)_n-NR'_2$ wherein R is a $C_2$ to $C_6$ alkylene group, preferably a $C_2$ to $C_4$ alkylene group, such as ethylene, isopropylene and the like, R' is a hydrogen, a lower alkyl group such as methyl, ethyl and the like, or a hydroxyalkyl group wherein the alkyl group contains from one to four carbon atoms, and n is from 0 to about 10, preferably from about 1 to about 5 with the proviso that the polyamine contains at least three primary or secondary amine hydrogens. Suitable aliphatic polyamines may include ethylenediamine (EDA), diethylenetriamine (DETA), triethylenetetramine (TETA), tetraethylenepentamine (TEPA), N-(2-aminoethyl)-1,3-propanediamine, N,N'-bis(3-aminopropyl)ethylenediamine, N,N'-bis(3-aminopropyl)-1,3-propanediamine, N,N'-bis(2-aminoethyl)-1,3-propanediamine, 3,3'-iminobispropylamine, 3,3'-diamino-N-methyl-dipropylamine, 1,2-diaminopropane, 1,3-diaminopropane, N-hydroxyethyl ethylenediamine, N-hydroxyethyl diethylenetriamine, N,N-dihydroxyethyl diethylenetriamine and the like, and polyamines such as 1,4-bis(3-aminopropyl)piperazine, 1,3-cyclohexane-bis (methylamine), and 4,4'-methylenebis(cyclohexylamine). Other suitable polyamines may include aromatic polyamines such as para-diaminobenzene, 4,4'-diaminophanyl-aniline and the like. Mixtures of the suitable polyamines may also be used. Polyalkylene-polyamines having a greater number of amine nitrogen groups naturally tend to provide greater amine nitrogen content to the reaction products and are preferred. While the alkylene portion of such polyalkylene-polyamines can be, e.g., ethylene, propylene and the like, it will preferably be an ethylene group since the larger alkylene groups would decrease the weight percent of amine nitrogen in the reaction product. Preferably, the polyamine is EDA, DETA, TETA or TEPA, more preferably DETA, TETA or TEPA and most preferably TEPA.

A monoepoxide, such as, e.g., a $C_{16}$ alpha olefin epoxide, 2-ethylhexylglycidyl ether, butylglycidyl ether, cresyl glycidyl ether, phenyl glycidyl ether (1,2-epoxy-3-phenoxypropane), propylene oxide, ethylene oxide, glycidol (2,3-epoxy-1-propanol) and the like, can also be included in forming the ungelled thermoplastic resin. A monoepoxide can be blended with polyepoxide and polyamine to form the ungelled resin or monoepoxide can be sequentially reacted by addition after reaction of the polyepoxide with the polyamine. The monoepoxides serve as reactive diluents and reduce the amine equivalents in a resultant ungelled thermoplastic resin.

In preparing the ungelled resins of this invention, the molar ratio of polyamine to polyepoxide in the reaction mixture is generally within the range of about 1.4:1 to about 0.83:1, preferably within the range of about 1.25:1 to about 1.05:1, and more preferably within the range of about 1.2:1 to about 1.1:1. The preferred reaction of this invention involves the reaction of a polyamine having about two primary amino nitrogen equivalents per mole (one equivalent per primary amino nitrogen group) with a polyepoxide having, most preferably, an average of two epoxy equivalents per mole, i.e., the reaction is between a diamine and a diepoxide.

In accordance with the present invention, the ungelled thermoplastic resins are prepared by careful control of the concentration of reactants and the temperature during reaction. In preparing the reaction products of this invention, the polyepoxide is added to a solution of the polyamine. Preferably, the polyepoxide is slowly added to the polyamine at temperatures sufficient to promote reaction of epoxy groups in the polyepoxide with amine hydrogens in the polyamine, such addition at a rate sufficient to avoid any buildup of polyepoxide concentration in the polyamine solution. Accordingly, the temperature of the reactants is generally controlled so that the reaction will proceed immediately as the polyepoxide is added so as to further avoid any buildup of polyepoxide. Both the polyamine and the polyepoxide can be initially dissolved in a suitable solvent. Optionally, the polyamine can be initially dissolved in a suitable solvent and the polyepoxide added as a neat material.

In preparation of the ungelled resins from polyamine and polyepoxide solutions, it has generally been found that the concentration of the respective solutions of polyepoxide and polyamine on a weight basis must be decreased as the ratio of polyamine to polyepoxide decreases from about 1.4:1 to about 0.83:1. For example, in preparing a polyamine-polyepoxide reaction product from a reaction mixture containing a ratio of polyamine to polyepoxide of about 1.40:1, the reactants are each generally at concentrations of less than about 20 percent by weight, preferably less than about 14 percent by weight to avoid gelation, while in preparing a polyamine-polyepoxide reaction product from a reaction mixture containing a ratio polyamine to polyepoxide of about 1.05:1, the reactants are each generally at concentrations of about 5 percent by weight or less. In preparation of the ungelled resins from neat polyepoxide and a polyamine solution, the polyamine solution will generally be at a concentration about half of the concentration at which such reactions are run when both reactants are in the solution. For example, at a ratio of about 1.4:1, the polyamine solution would generally be at a concentration of less than about 10 percent by weight, preferably less than about 7 percent by weight when the polyepoxide is added neat.

Temperatures at which the reaction is run are also critical in obtaining the ungelled product. Generally, the temperature during the reaction will be in the range of about 40° C. to about 140° C., preferably from about 60° C. to about 120° C., more preferably from about 70° C. to about 110° C.

Suitable solvents in which the reaction may be conducted include oxygenated solvents, e.g., alcohols such as methanol, ethanol, propanol and the like, glycol ethers, such as 2-methoxyethanol, 2-ethoxyethanol, 2-propoxyethanol, 2-butoxyethanol, 1-methoxy-2-propanol, 1-ethoxy-2-propanol, 1-butoxy-2-propanol and the like, and halogenated solvents, e.g., chlorinated solvents such as methylene chloride, 1,1,1-trichloroethane and the like. Mixtures of such solvents may also be employed. The glycol ethers are the preferred solvents with 2-butoxyethanol and 1-methoxy-2-propanol being especially preferred. The solvent may also be water and the reaction can be conducted in an aqueous medium depending upon the selection of polyepoxide reactants. For example, where the polyglycidyl ether is of a polyhydric aliphatic alcohol, such as 1,4-butanediol, the reaction with the polyamines can be conducted in water.

The ungelled resins of the present invention are characterized as being substantially free of epoxy functionality (i.e., epoxy equivalent weights greater than 10,000) and as containing amine functionality, primarily both primary and secondary amino nitrogen functionalities, but also including minor levels of tertiary amino nitrogen functionality. The ungelled resins are further characterized as thermoplastic resins. By "thermoplastic" is meant a polymer that softens upon heating but which substantially returns to its original condition upon cooling to room temperature. By "substantially returns" is meant that such thermoplastic resins may undergo minor branching or crosslinking upon heating but that such resin remains essentially uncured and accordingly may be redissolved. The ungelled resins are still further characterized as containing at least about five percent by weight amine nitrogen, preferably at least about seven percent by weight amine nitrogen and more preferably at least about nine percent by weight amine nitrogen.

After the ungelled thermoplastic resins are prepared by reaction at the low concentrations and at suitable temperatures, the resultant product is in the form of a dilute solution. Thereafter, solvent can be stripped, i.e., removed, in any desired amount. For example, solvent may be stripped to give solutions of the ungelled thermoplastic resins at greater concentrations (weight percent in solution) for easier use as a coating composition. Preferably, the solvent is stripped under vacuum to minimize the temperature needed to remove the solvent. Such vacuum-stripping can minimize color intensity which may result from heating from the amine-functional resin. Such higher weight percent solutions do not undergo the gelation that would occur if the polyepoxide and polyamine reactants had been originally reacted at such concentrations. Optionally, the solvent may be entirely stripped to yield a solid ungelled thermoplastic resin. Naturally, as solvent is stripped, the solutions of ungelled thermoplastic resins will increase in viscosity.

The ungelled thermoplastic resins of this invention have a high level of amine functionality, including primary and/or secondary amine functionalities. Accordingly, such resins may be reacted with materials capable of reacting with such amine functionalities, e.g., an epoxide, acrylate, an anhydride, an oxalate, an isocyanate and the like. For example, the ungelled thermoplastic resins of this invention can be reacted with additional polyepoxide or a polyoxalate to form a thermoset material as described in commonly assigned, copending application entitled "Barrier Coatings" by Nugent et al, filed on the same date herewith.

In further accordance with the present invention, it has been found that ungelled thermoplastic resins which are reaction products of a polyamine containing up to about two primary amino nitrogen groups per molecule and a polyepoxide can be utilized as thermoplastic barrier coating compositions. Films or layers of such ungelled thermoplastic resins have excellent gas-barrier properties, i.e., low permeability to oxygen and carbon dioxide, and can be used on substrates wherein greater gas impermeability is desired. For example, many packaging film materials and containers made from, e.g., polyolefins, such as polyethylene or polypropylene, or polycarbonates, have undesirably high gas permeabilities. This can result in shelf-life problems for the package or container as, e.g., carbon dioxide permeates and escapes from a pop container or oxygen permeates into a food container and degrades the contents therein.

Suitable ungelled thermoplastic resins can be formed from reaction mixtures including a polyamine and a polyepoxide at a ratio of from about 2:1 to about 0.83:1 based upon moles of polyamine to moles of polyepoxide. Preferably, the ungelled thermoplastic resins are essentially devoid of oxyalkylene moieties and are formed from a reaction mixture having a polyamine to polyepoxide ratio of from about 1.4:1 to about 0.83:1 based upon moles of polyamine to moles of polyepoxide. Multilayer packaging materials of the present invention comprise at least one layer of a gas-permeable polymeric material and at least one layer of an ungelled thermoplastic barrier material characterized as containing at least about five percent amine nitrogen, preferably at least about seven percent amine nitrogen and more preferably at least about nine percent amine nitrogen. By "gas permeable" is meant that such polymeric materials have a gas permeability greater than that of the ungelled thermoplastic resins.

Such thermoplastic coating compositions can be applied, preferably in the form of a solution of the ungelled thermoplastic resins in an organic or aqueous medium, onto a suitable substrate and dried to form a film. The solvents previously described as useful in synthesis of ungelled thermoplastic resins can be used as the organic medium in the coating composition. The ungelled thermoplastic resins can be dispersed in an aqueous medium, if desired, by partially neutralizing the amine groups with acid. Suitable acids include organic acids such as formic acid, lactic acid, and acetic acid, or inorganic acids such as hydrochloric acid or phosphoric acid. Use of organic acids is preferred. The extent of neutralization depends upon the particular reaction product but generally only a sufficient amount to solubilize and disperse the resin in an aqueous medium is neutralized. Usually, reaction products which are not originally soluble in water are neutralized to the extent of about 25 percent of the total theoretical neutralization. Obviously, those ungelled thermoplastic resins which can be prepared by reaction in an aqueous medium do not need to be neutralized with acid.

In the preparation of a multilayer packaging material, a gas-permeable polymeric material can be coated with a layer of an ungelled thermoplastic resin coating composition, e.g., by spraying, and the coating composition can be dried, i.e., solvent removed, by heating for sufficient time at temperatures sufficient to leave a film of the thermoplastic coating. The drying temperatures will generally be beneath the temperature at which the gas-permeable polymeric material suffers any detrimental effects, such as distortion, e.g., temperatures of from about 160° Fahrenheit (F) to 230° F. Such drying can require from about 1 minute to about 60 minutes. Optionally, the film may be dried at lower temperatures, as low as about 70° F., by allowing for drying over a time period of several days.

In one embodiment, the barrier layer is applied onto one layer of a gas-permeable polymeric material and partially dried to remove the bulk of the solvent. Thereafter, a second layer of the gas-permeable polymeric material is applied over the barrier layer to form a laminate and the laminate can be pressed together at temperatures, for periods of time, and under pressures sufficient to provide adhesion between the layers. For example, such a laminate may be pressed under pressures of from about 5 to about 200 pounds per square inch (psi) or more at temperatures of from ambient temperatures up to about 400° Fahrenheit (F) with the proviso that the temperature preferably does not adversely affect the gas-permeable polymeric material.

In a preferred embodiment, polypropylene is the gas-permeable polymeric material. The surface of the polyolefin, i.e., the polypropylene, is preferably treated to increase surface tension, e.g., by flame-treating, corona-treating and the like, all of which are well known to those skilled in the art. Such treatments are described in detail by Pinner et al, in Plastics: Surface and Finish, Butterworth & Co., Ltd. (1971), Chapter 3, on surface treatment for plastic films and containers, and this description of surface treatments is herein incorporated by reference. Such treatments promote better adhesion of the gas-barrier layer to the polyolefin material.

The above-described packaging material may be formed into containers by conventional plastic processing techniques. For example, sheets, films, and other structures can be formed by well-known lamination or extrusion techniques. Film or sheet material made from the multilayer packaging material may be formed into articles such as wrappers, bags and the like. Molded containers may be made from the above-described packaging material by blow molding the packaging material or by other such molding techniques all of which are well known in the art. The containers and multilayer packaging materials of the present invention are ideally suited for protecting food, beverages, medicines and like substances. The principal advantage of the packaging materials and containers of this invention is the low gas permeability relative to the gas-permeable polymeric materials.

The multilayer packaging materials and containers of the present invention do not require the use of adhesives, tie layers or the like between the respective gas-permeable polymeric materials and the barrier materials of this invention.

In the packaging materials and containers including at least one layer of an ungelled thermoplastic resin, such a layer or layers may be situated as an inside layer, a middle layer or an outside layer of said packaging materials or containers. For example, the ungelled thermoplastic resin layer may be either the inner layer in contact with the contents of a container or the outer layer adjacent to the atmosphere. Preferably, the ungelled thermoplastic resin layer or layers will be sandwiched between layers of a gas-permeable polymer, e.g., in a laminate. The ungelled thermoplastic resin may also be used on substrates formed of gas-permeable polymer materials such as polyesters, e.g., poly(ethylene terephthalate), polyacrylonitrile, and polystyrene.

The addition of pigment to a coating composition of an ungelled thermoplastic resin may further reduce the gas permeability of the thermoplastic barrier material. Among the useful pigments may be included titanium dioxide, micas, silica pigments, talc and aluminum or glass particulates, e.g., flakes. Micas, aluminum flakes, and glass flakes may be preferred due to the plate-like structure of such materials. Such platelike materials may increase the tortuousness of any pathway a gas would take through the barrier layer. Generally, when pigments are included in the coating compositions, the weight ratio of pigment to binder is about 1:1, preferably about 0.3:1 and more preferably about 0.05:1, the binder weight being the total weight of the ungelled thermoplastic resin in the coating composition.

The present invention is more particularly described in the following examples which are intended as illustrative only since numerous modifications and variations will be apparent to those skilled in the art. Examples 1–14 illustrate various ungelled thermoplastic resins of the invention. Example 15 illustrates coatings of ungelled thermoplastic resins on gas-permeable polymer film and a laminate of a gas-permeable polymer film and ungelled thermoplastic resins.

Testing Procedures

Oxygen gas transmission rates through plastic films and laminates were determined in accordance with ASTM D3985-81 using a MOCON ® OX-TRAN film permeation test system, available from Modern Control, Inc. (Minneapolis, Minn.).

EXAMPLE 1

An ungelled thermoplastic resin (an ungelled epoxy-amine adduct) was prepared by the following procedure: A reaction vessel was charged with one mole (146 grams (g)) of triethylenetetramine (TETA) and 897 g of 1-methoxy-2-propanol, available from Dow Chemical Corp. as DOWANOL PM (14 percent by weight TETA in the total charge) and the admixture was heated to 100° C. under a nitrogen atmosphere. A mixture of 0.85 mole (320 g) of a diglycidyl ether of bisphenol A (available as EPON 828 epoxy from Shell Chemical Corporation (molecular weight of 376.47)) and 1963 g of 1-methoxy-2-propanol was then gradually added over one hour. The reaction mixture was held at 100° C. for two hours, followed by heating at 110° C. to strip solvent. The resultant product had a theoretical molecular weight of about 3,200, a percent solids as measured at 110° C. for one hour of 39.9 percent, a theoretical amine nitrogen content by weight of 11.95 percent and a theoretical amine hydrogen equivalent weight of about 109.

EXAMPLE 2

Example 1 was repeated with the exception that the solvent was 2-bytoxyethanol (available as BUTYL CELLOSOLVE ® from Union Carbide Corporation). The unstripped product had a percent solids of 15.1.

EXAMPLE 3

An ungelled epoxy-amine adduct was prepared as follows: A reaction vessel was charged with one mole (146 g) of TETA and 584 g of 1-methoxy-2-propanol and the admixture was heated under nitrogen to 100° C. A mixture of 0.85 mole (172 g) of a 1,4-diglycidyl ether of butanediol (available as ARALDITE RD-2 epoxy from Ciba-Geigy Corporation) and 687 g of 1-methoxy-2-propanol was gradually added over one hour. The reaction mixture was held at 100° C. for two hours, followed by heating at 110° C. to strip solvent. The resultant product had a theoretical molecular weight of about 2200, a percent solids as measured at 110° C. for one hour of 29.2 percent, a theoretical amine nitrogen content by weight of 17.45 percent and a theoretical amine hydrogen equivalent weight of about 75.

EXAMPLE 4

Example 3 was repeated with the exception that the solvent was 2-butoxyethanol. The unstripped product had a percent solids of 18.68.

EXAMPLE 5

An ungelled epoxy-amine adduct was prepared as follows: A reaction vessel was charged with 1.2 mole (123.6 g) of diethylenetriamine (DETA) and 700 g of 1-methoxy-2-propanol. The admixture was heated under nitrogen to 100° C. and a mixture of 1.02 mole (384 g) of EPON 828 epoxy and 2173 g of 1-methoxy-2-propanol was added over one hour. The reaction mixture was then held at 100° C. for a total of about two hours, followed by heating at 110° C. to strip solvent. The resultant product had a theoretical molecular weight of about 3000, a percent solids as measured at 110° C. for one hour of 32.5 percent, a theoretical amine nitrogen content by weight of 9.87 percent and a theoretical amine hydrogen equivalent weight of about 130.

EXAMPLE 6

Example 5 was repeated except that the solvent was 2-butoxyethanol. The unstripped product had a percent solids of 15.31.

EXAMPLE 7

An ungelled epoxy amine adduct was prepared as follows: A reaction vessel was charged with one mole (189 g) of tetraethylene-pentamine (TEPA) and 1161 g of 2-butoxyethanol. The admixture was heated under nitrogen to 100° C. and a mixture of 0.857 mole (322.2 g) of EPON 828 epoxy and 1979 g of 2-butoxyethanol was added over one hour. The reaction mixture was then held at 100° C. for a total of about two hours. The resultant product had a theoretical molecular weight of about 3600, a percent solids as measured at 110° C. for one hour of 15.0 percent, a theoretical equivalent weight per amine hydrogen of 96.7 g and a theoretical amine nitrogen content of 11 percent basis total resin solids.

EXAMPLE 8

Example 7 was repeated with the exception that the solvent was 1-methoxy-2-propanol. The resultant product was vacuum stripped to remove solvent at 81° C. The resultant product had a total solids of 30.1 percent.

EXAMPLE 9

An ungelled epoxy-amine adduct charged with 0.5 mole (94.5 g) of TEPA in 1571 g of 1-methoxy-2-propanol. The admixture was heated under nitrogen to 100° C. and 0.429 mole (161 g) of neat EPON 828 epoxy was added over one hour. The reaction mixture was then held at 100° C. for about two hours. The resultant product had a theoretical molecular weight of about 3600, a percent solids as measured at 110° C. for one hour of 14.0 percent, a theoretical equivalent weight per amine hydrogen for 96.3 and a theoretical amine nitrogen content of 13.7 percent basis total resin solids.

EXAMPLE 10

An ungelled epoxy-amine adduct was prepared in water as follows: A reaction vessel was charged with 73 g of TETA (0.5 mole) and 292 g of deionized water. The admixture was heated under nitrogen to 100° C. and a mixture of 85.9 g of RD-2 epoxy (0.425 mole) in 343.6 g of deionized water was gradually added over one hour. The reaction mixture was held at about 100° C. for a total of two hours. The resultant product had a percent solids as measured at 110° C. for one hour of 19.32 percent, a theoretical molecular weight of about 2250, a theoretical amine nitrogen content on percent by weight basis of 17.45 and a theoretical amine hydrogen equivalent weight of about 75.

EXAMPLE 11

An ungelled epoxy-amine adduct was prepared as follows: A reaction vessel was charged with 100 g of bis(aminopropyl)piperazine (0.5 mole) and 566.7 g of 2-butoxyethanol. The admixture was heated under nitrogen to 100° C. and a mixture of 141 g of EPON 828 (0.375 mole) in 799 g of 2-butoxyethanol was added over one hour. The reaction mixture was held at 100° C. for a total of two hours. The resultant product had a theoretical molecular weight of about 1928, a percent solids of 16.0, a theoretical amine nitrogen content on percent by weight basis of 11.6 and a theoretical amine hydrogen equivalent weight of about 193.

EXAMPLE 12

An ungelled epoxy-amine adduct was made in solvent and solubilized in water as follows: A reaction flask was charged with 51.5 g of DETA (0.5 mole) and 291.8 g of 1-methoxy-2-propanol. The admixture was heated under nitrogen to 100° C. and a mixture of 159.8 g of EPON 828 epoxy (0.425 mole) and 905.5 g of 1-methoxy-2-propanol was added over one hour. The reaction mixture was held at 100° C. for two hours after which 22.5 g of acetic acid was added. Solvent was then stripped from the resultant product by heating at from 110° C. to 120° C. After a total of 500 g of solvent was removed, about 1000 g of deionized water was added and heated to reflux. A total of 800 g of distillate was removed, followed by addition of 800 g of deionized water and additional distillation of 800 g solvent. The resultant product had an acid value of 14.37, a total solids of 35.5 percent, and a theoretical amine hydrogen equivalent weight of about 184.

EXAMPLE 13

An ungelled epoxy-amine adduct at an equivalent ratio of 1:1 of epoxy equivalents to primary amine equivalents (each primary amine considered as monofunctional) was prepared as follows: A reaction vessel was charged with 58.4 g of TETA (0.4 mole) and 1109.6 g of 1-methoxy-2-propanol. The admixture was heated under nitrogen to 100° C. and a mixture of 150.4 g of EPON 828 (0.4 mole) and 2857.6 g of 1-methoxy-2-propanol was added over one hour. The reaction mixture was held at 100° C. for two hours. The resultant product was at about five percent by weight solids. The solvent was gradually stripped until a total of 3543 g of distillate was recovered. The resultant product was ungelled and had a percent solids as measured at 105° C. for four hours of 55.5.

EXAMPLE 14

An ungelled epoxy-amine adduct was prepared as follows: A reaction vessel was charged with one mole (189 g) of tetraethylene-pentamine (TEPA) and 1161 g of 1-methoxy-2-propanol. The admixture was heated under nitrogen to 100° C. and a mixture of 0.857 mole (322.2 g) of EPON 828 epoxy and 1979 g of 1-methoxy-2-propanol was added over one hour. The reaction mixture was then held at 100° C. for a total of about two hours. The resultant product had a percent solids as measured 110° C. for one hour of 25.2 percent, a theoretical equivalent weight per amine hydrogen of 96.7 g and a theoretical amine nitrogen content of 13.7 percent basis total resin solids.

This adduct was then reacted with a monoepoxide thereby reducing the amine equivalents in the product as follows: A total of 500 g of the adduct at 25.2 percent by weight resin solids in 1-methoxy-2-propanol was charged into a reaction vessel equipped with a nitrogen sparge. The charge was heated to about 50° C. whereupon 28.9 g of glycidol was slowly added dropwise while maintaining the resultant exotherm under 100° C. After the glycidol addition was complete, the reaction mixture was heated at 100° C. for one hour. The resultant product had a percent solids as measured at 110° C. for one hour of 31.6 percent, a theoretical equivalent weight per amine hydrogen of 169.8 g and a theoretical amine nitrogen content of 11.1 percent basis total resin solids.

EXAMPLE 15

Coatings of an ungelled thermoplastic resin on a film of corona-treated polypropylene and laminates of an ungelled thermoplastic resin between two films of corona-treated polypropylene, each 1-mil thick (available from Phillips Joanna, a division of Joanna Western Mills Company, as PJX-2135 polypropylene film), were formed with the following ingredients:

| Sample | Type of Ungelled Thermoplastic Epoxy-amine Resin |
|---|---|
| A | Similar to resin of Example 8 |
| B | Similar to resin of Example 14 |
| C | Similar to resin of Example 14 |

Coatings were applied on the polypropylene film by drawdown. A laminate was formed by first drawing down the resin onto a corona-treated surface of a polypropylene film and heating for 20 minutes at 160° F. to remove solvent. The dried film thickness of the ungelled thermoplastic resins varied from 0.5 to 1.0 mil. Then, a corona-treated surface of a second polypropylene film was placed over the resin and laminated in a Pasendena Hydraulics Heated Press, Model B247C-2H-E-X3-5. The sample was laminated at 310° F. and 100 pounds per square inch (psi) for five minutes. The resultant laminate was tested for adhesion by hand pulling the sheets apart (adhesion results—very good) and oxygen permeability while the coated films were tested for oxygen permeability. The permeability results are given in Table 1. A laminate of two films of polypropylene was tested for comparison.

TABLE 1

| Sample | Type[1] | Oxygen Permeability (cc-mil/100 in$^2$-day-atm at 23° C. and 0% R. H.) |
|---|---|---|
| A | 1 | 14.7 |
| B | 1 | 4.3 |
| C | 2 | 2.8 |
| polypropylene laminate | 2 | 116 |

(1) [1]As a coating on polypropylene film.
[2]As a laminate.

Example 15 demonstrates that a coating of ungelled thermoplastic resins of the present invention provides gas-barrier properties superior to those of a gas-permeable polymeric material such as polypropylene alone.

Although the present invention has been described with reference to specific details, it is not intended that such details should be regarded as limitations upon the scope of the invention, except as to the extent that they are included in the accompanying claims.

What is claimed is:

1. A container comprising at least one layer of a gas permeable polymer selected from the group consisting of polyesters, polycarbonates or polyolefins, and at least one layer of an ungelled thermoplastic resin comprising a reaction product of a polyamine essentially devoid of oxyalkylene moieties and containing up to about two primary amino nitrogen groups per molecule and a polyepoxide, the polyamine and the polyepoxide present in the reaction mixture at a ratio of from about 1.4:1 to about 0.83:1 based upon moles of polyamine to moles of polyepoxide; the ungelled resin is further characterized as containing at least about seven percent by weight amine nitrogen.

2. The container of claim 1 wherein the polyamine is an aliphatic polyamine selected from the group consisting of ethylenediamine, diethylenetriamine, triethylenetetramine and tetraethylenepentamine.

3. The container of claim 2 wherein the polyepoxide is a diglycidyl ether of an aromatic diol or a diglycidyl ether of an aliphatic diol.

4. The container of claim 3 wherein the polymer is a polyolefin.

5. The container of claim 4 wherein the polymer is polypropylene.

6. The container of claim 3 wherein the layer of the ungelled thermoplastic resin is sandwiched between layers of gas-permeable polymers.

7. The container of claim 1 wherein the ungelled thermoplastic resin has been modified by reaction with a monoepoxide.

8. A multilayer packaging material comprising at least one layer of a gas-permeable polymer selected from the group consisting of polyesters, polyolefins or polycarbonates, and at least one layer of an ungelled, thermoplastic resin comprising a reaction product of a polyamine essentially devoid of oxyalkylene moieties and containing up to about two primary amino nitrogen groups per molecule and a polyepoxide, the polyamine and polyepoxide present in the reaction mixture in a ratio of from about 1.4:1 to about 0.83:1 based upon moles of polyamine to moles of polyepoxide; the ungelled resin is further characterized as containing at least about seven percent by weight amine nitrogen.

9. The packaging material of claim 8 wherein the polyamine is an aliphatic polyamine selected from the group consisting of ethylenediamine, diethylenetriamine, triethylenetetramine and tetraethylenepentamine.

10. The packaging material of claim 9 wherein the polyepoxide is a diglycidyl ether of an aromatic diol or a diglycidyl ether of an aliphatic diol.

11. The packaging material of claim 10 wherein the polymer is a polyolefin.

12. The packaging material of claim 11 wherein the polymer is polypropylene.

13. The packaging material of claim 10 wherein the layer of the ungelled thermoplastic resin is sandwiched between layers of a gas-permeable polymer.

14. The packaging material of claim 8 wherein the ungelled thermoplastic resin has been modified by reaction with a monoepoxide.

* * * * *